(12) United States Patent
Yoshimura et al.

(10) Patent No.: US 8,044,148 B2
(45) Date of Patent: Oct. 25, 2011

(54) MODIFIED STYRENE-MALEIC ACID COPOLYMER AND USE THEREOF

(75) Inventors: Takeshi Yoshimura, Moriguchi (JP);
Tetsuya Maekawa, Amagasaki (JP);
Takaharu Nakagawa, Ikoma-gun (JP);
Toyoyuki Urabe, Ikeda (JP)

(73) Assignees: Panasonic Electric Works Co., Ltd., Osaka (JP); International Center For Environmental Technology Transfer, Mie (JP)

( * ) Notice: Subject to any disclaimer, the term of this patent is extended or adjusted under 35 U.S.C. 154(b) by 55 days.

(21) Appl. No.: 11/720,201

(22) PCT Filed: Nov. 22, 2005

(86) PCT No.: PCT/JP2005/021464
§ 371 (c)(1),
(2), (4) Date: May 25, 2007

(87) PCT Pub. No.: WO2006/057250
PCT Pub. Date: Jun. 1, 2006

(65) Prior Publication Data
US 2008/0021162 A1    Jan. 24, 2008

(30) Foreign Application Priority Data

Nov. 25, 2004  (JP) ................. 2004-341135
Feb. 23, 2005  (JP) ................. 2005-047998
Jul. 26, 2005  (JP) ................. 2005-216377

(51) Int. Cl.
C08F 20/04    (2006.01)

(52) U.S. Cl. ............... 525/329.5; 525/327.4; 525/327.8; 525/333.3; 525/359.1; 525/359.6; 525/185; 525/327.7; 526/317.1; 526/318.2; 526/318.4; 526/318.43; 526/321; 526/326; 526/346; 526/347

(58) Field of Classification Search ............ 525/107, 525/108, 119, 329.5, 327.4, 333.3, 359.1, 525/359.5, 359.6
See application file for complete search history.

(56) References Cited

U.S. PATENT DOCUMENTS

| | | | | |
|---|---|---|---|---|
| 3,085,994 A | * | 4/1963 | Muskat | 526/272 |
| 3,245,933 A | * | 4/1966 | Muskat | 524/388 |
| 3,753,842 A | * | 8/1973 | Pittman | 442/366 |
| 3,966,679 A | * | 6/1976 | Gross | 525/107 |
| 4,427,820 A | * | 1/1984 | Backhouse et al. | 524/504 |
| 4,681,833 A | * | 7/1987 | Nagasawa et al. | 430/175 |
| 4,855,374 A | * | 8/1989 | Murata et al. | 526/261 |
| 5,252,445 A | * | 10/1993 | Timmerman et al. | 430/529 |
| 5,554,695 A | * | 9/1996 | Machida et al. | 525/268 |
| 2001/0031829 A1 | * | 10/2001 | Barkac et al. | 525/119 |
| 2002/0039655 A1 | * | 4/2002 | Freeman et al. | 428/402.24 |
| 2006/0247465 A1 | | 11/2006 | Hidaka et al. | |

FOREIGN PATENT DOCUMENTS

| | | |
|---|---|---|
| JP | 44 26112 | 11/1969 |
| JP | 56 36504 | 4/1981 |
| JP | 61 53305 | 3/1986 |
| JP | 62 127302 | 6/1987 |
| JP | 4-249509 | * 9/1992 |
| JP | 07-150024 | 6/1995 |
| JP | 9 59474 | 3/1997 |
| JP | 09-176411 | 7/1997 |
| JP | 10 265660 | 10/1998 |
| JP | 2000 281848 | 10/2000 |
| JP | 2005 336322 | 12/2005 |
| JP | 2006 36938 | 2/2006 |
| JP | 2006 8984 | 12/2006 |
| WO | WO 2004/041917 A1 | 5/2004 |

OTHER PUBLICATIONS

Weiss, Graft Copolymers from Poly(styrene co Dimethyl Maleate) and Poly(stryrene co Allyl Acetate), Journal of Polymer Science, p. 343-354, 1959.*

Office Action issued Nov. 24, 2010, in Japan Patent Application No. 2006-547794, with English Translation (summary).

* cited by examiner

Primary Examiner — Vasu Jagannathan
Assistant Examiner — Robert C Boyle

(57) ABSTRACT

The present invention relates to a modified styrene-maleic acid copolymer obtained by reacting a carboxylic acid group in a styrene-maleic acid copolymer with a halogen and/or epoxy compound. The modified styrene-maleic acid copolymer is useful as a low profile additive for a thermosetting resin, a water-absorbing material, etc.

5 Claims, No Drawings

MODIFIED STYRENE-MALEIC ACID COPOLYMER AND USE THEREOF

TECHNICAL FIELD

The present application was filed claiming the priority of the Japanese Patent Application Nos. 2004-341135, 2005-047998 and 2005-216377, the entire contents of which are herein incorporated by reference.

The present invention relates to a modified styrene-maleic acid copolymer based on a styrene-maleic acid copolymer, which is obtained by decomposing a thermosetting resin and recovering the decomposition product, and the use thereof.

BACKGROUND ART

Thermosetting resins such as fiber-reinforced plastics (FRPs) have been widely used as a material for bathroom component products such as a bathtub. Unlike thermoplastic resins, thermosetting resins cannot be recycled by melting and remolding them. In addition, the resins generally contain about 70% of inorganic materials such as an inorganic filler, and therefore, the self-combustion of the resins is difficult. Accordingly, most of waste plastics such as FRPs based on thermosetting resins have been dumped by reclaiming lands with the same, since they are very difficult for recycling. However, this waste disposal by way of reclaiming the lands has difficulties in the ensuring of sites to be reclaimed and in stable hardening of such sites. To solve these problems, the Containers and Packaging Recycling Law was instituted in 1995 in Japan, so as to obligate the recovering and recycling of plastics. This trend of recovering and recycling products containing plastics is prevailing in association with the enforcement of a variety of recycling laws.

Under these situations, recently, trials to recycle waste plastics for use as a resource have been attempted. As one of such trials, there is proposed a method of recovering useful oily substances from waste plastics by decomposing the waste plastics through a reaction using supercritical water as a reaction medium. There is also proposed a method of recycling fiber reinforced plastics used in various structural materials, in which the plastic components in such materials are decomposed by using supercritical water or subcritical water, so as to recover fibers such as glass fibers and carbon fibers for recycling them.

By these methods, plastics are decomposed into oily components having lower molecular weights so as to recycle these components as liquid fuels. There is further proposed a method of decomposing plastics, which makes use of a hydrolysis reaction by high temperature water vapor. According to this method, it is possible to decompose the organic polymer components of thermoplastic and thermosetting plastics to some extents.

However, the above methods have a disadvantage in that, since plastics are decomposed in random, the decomposition products are oily materials comprising various components, and thus in that it is difficult to obtain decomposition products with constant qualities. Consequently, a post-treatment for reforming the oily materials by using a catalyst, typically, zeolite, is needed, which results in higher cost. Further, it is difficult to produce petroleum products such as lamp oil and light oil from such reformed oils, and therefore, such reformed oils have not yet been put into practical use.

In the method described in the following Patent Literature 1, the decomposed resin is recycled as an unsaturated polyester resin again. However, the method has problems that the re-cured product of the decomposed resin has different properties from those of the original thermosetting resin (i.e., the resin has lower properties as a thermosetting resin), and the occupancy rate of the decomposed resin in the re-cured product is limited to a low extent, since the thermal decomposition of the decomposed resins is occurred due to the high decomposition temperature.

Recently, there is proposed a method for decomposing a thermosetting resin with subcritical water having a strong hydrolysis ability. More specifically, the method comprises hydrolyzing a thermosetting resin with subcritical water as a reaction solvents recovering the resultant low to middle molecular weight compound, and reusing the compound as a raw material for a resin (see, for example, the Patent Literature 2 and the like).

Patent Literature 1: JP-A-9-221565 (1997)
Patent Literature 2: JP-A-10-024274 (1998)

DISCLOSURE OF INVENTION

However, when a thermosetting resin is decomposed and recovered the decomposition product as described above, the recovered decomposition product as is cannot be reused. Consequently, it is desired to modify the recovered decomposition product to be reusable Under the above-discussed circumstances, the present invention is accomplished, and an object of the present invention is to provide a modified styrene-maleic acid copolymer, which is reusable and is obtained by modifying a recovered decomposition product of a thermosetting resin, and the use thereof.

Means for Solving the Problems

The present invention includes the followings:

<1> A modified styrene-maleic acid copolymer, which is obtained by reacting a carboxylic acid group in a styrene-maleic acid copolymer with a halogen and/or epoxy compound.

<2> The modified styrene-maleic acid copolymer according to the above-mentioned <1>, wherein the halogen and/or epoxy compound is a halogen compound containing no unsaturated groups.

<3> The modified styrene-maleic acid copolymer according to the above-mentioned <2>, wherein the halogen compound containing no unsaturated groups is a compound selected from epichlorohydrin, 1-3-dichloro-2-propanol, chlorobenzene, benzyl chloride, a benzyl chloride compound having a substituent bound to the benzene ring, and a halogenated alkyl.

<4> The modified styrene-maleic acid copolymer according to the above-mentioned <2> or <3>, which is obtained by reacting a carboxylic acid group in a styrene-maleic acid copolymer with a halogen compound containing no unsaturated groups such that the amount of the halogen in the compound is ⅘ or more equivalent relative to the amount of the carboxylic acid group in the copolymer.

<5> The modified styrene-maleic acid copolymer according to the above-mentioned <1>, wherein the halogen and/or epoxy compound is a compound containing at least two halogens and/or epoxy groups.

<6> The modified styrene-maleic acid copolymer according to the above-mentioned <5>, wherein the compound containing at least two halogens and/or epoxy groups is a compound selected from 1,3-dichloro-2-propanol, epichlorohydrin, and 1,4-butanediol diglycidyl ether.

<7> The modified styrene-maleic acid copolymer according to the above-mentioned <5> or <6>, which is obtained by reacting a carboxylic acid group in a styrene-maleic acid copolymer with a compound containing at least two halogens and/or epoxy groups such that the amount of the halogen and/or epoxy group in the compound is ⅘ or less equivalent relative to the amount of the carboxylic acid group in the copolymer.

<8> The modified styrene-maleic acid copolymer according to any one of the above-mentioned <1> to <7>, wherein the styrene-maleic acid copolymer is obtained by decomposing a thermosetting resin comprising a polyester and its crosslinking moiety with subcritical water.

<9> A process for producing a modified styrene-maleic acid copolymer according to the above-mentioned <1>, which comprises reacting a carboxylic acid group in a styrene-maleic acid copolymer with a halogen and/or epoxy compound.

<10> An unsaturated polyester resin composition comprising the modified styrene-maleic acid copolymer according to any one of the above-mentioned <2> to <4>, styrene, an unsaturated polyester resin, and a radical initiator.

<11> A low profile additive for a thermosetting resin comprising the modified styrene-maleic acid copolymer according to any one of the above-mentioned <2> to <4>.

<12> A water-absorbing material comprising the modified styrene-maleic acid copolymer according to any one of the above-mentioned <5> to <7>.

<13> A process for recycling a thermosetting resin, which comprises decomposing a thermosetting resin comprising a polyester and its crosslinking moiety with subcritical water to thereby obtain a styrene-maleic acid copolymer, and reacting the carboxylic acid group in the styrene-maleic acid copolymer with a halogen and/or epoxy compound to thereby obtain a modified styrene-maleic acid copolymer.

EFFECT OF THE INVENTION

The modified styrene-maleic acid copolymer according to the present invention is one obtained by modifying a carboxylic acid group in a styrene-maleic acid copolymer with a halogen and/or epoxy compound, and can be effectively utilized as a low profile additive for a thermosetting resin, a water-absorbing material, etc.

The unsaturated polyester resin composition according to the present invention contains the above-mentioned modified styrene-maleic acid copolymer as a low profile additive, and can be molded without curing shrinkage.

The process for recycling a thermosetting resin according to the present invention comprises decomposing a thermosetting resin, recovering the resultant styrene-maleic acid copolymer, and modifying the copolymer with a halogen and/or epoxy compound, and can provide a method for recycling the copolymer as a low profile additive for a thermosetting resin, a water-absorbing material, etc.

BEST MODE FOR CARRYING OUT THE INVENTION

The styrene-maleic acid copolymer in the present invention is a copolymer containing a structural unit represented by the formula (1):

[Formula 1]

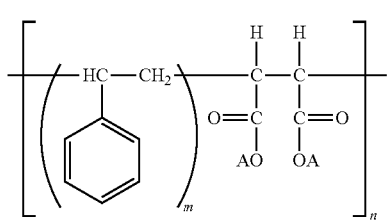

(1)

wherein, A is a hydrogen atom or a metal element, m is a number from 1 to 3, n is a number from 3 to 300, and both ends are hydrogen atoms. In other words, the compound is a copolymer of styrene with maleic acid (including a copolymer of styrene with fumaric acid).

The metal element represented by A in the above-mentioned formula (1) includes an alkaline metal such as lithium, sodium and potassium; an alkaline earth metal such as calcium; and the like. When the metal element represented by A is a di- or more valent metal element (e.g., calcium), the metal element may form a salt with plural carboxy groups, which are not limited to those in the same molecule.

The above-mentioned styrene-maleic acid copolymer can be obtained, for example, by hydrolyzing a thermosetting resin comprising a polyester and its crosslinking moiety with subcritical water.

Hereinafter, this method will be described, but the resin in the present invention is not limited to the resin obtained by the method.

The term "polyester" in the above-mentioned "thermosetting resin comprising a polyester and its crosslinking moiety" referred to means a polymer which is obtained by polycondensation of a polyhydric alcohol component and a polybasic acid component so that polyhydric alcohol residues and polybasic acid residues are linked to each other through ester bonds. The polyester may contain a double bond derived from, for example, an unsaturated polybasic acid.

The term "crosslinking moiety" means a moiety which crosslinks the molecules of the polyester. The crosslinking moiety is, for example, a moiety derived from a crosslinking agent, although not particularly limited thereto. The crosslinking moiety may be a moiety derived from one molecule of crosslinking agent or derived from an oligomer or a polymer (hereinafter collectively referred to as a "polymer") formed by polymerizing a plurality of crosslinking agents. Further, the position and manner of bonding between the molecules and the polyester are not particularly limited.

Accordingly, the "thermosetting resin comprising a polyester and its crosslinking moiety" is a network thermosetting polymer (or a network polyester resin) which is prepared by crosslinking a polyester obtained from a polyhydric alcohol component and a polybasic acid component, through a crosslinking moiety.

In this connection, the "thermosetting resin" to be used in the present invent-on mainly means a resin which is cured (or crosslinked) by heating or the like. However, the scope of the resin according to the present invention includes an uncured or partially cured resin of which the curing (or crosslinking) is proceeding by heating or the like.

Examples of the polyhydric alcohol in the above-mentioned "polyester" include, but not limited to, glycols such as ethylene glycol propylene glycol, diethylene glycol and dipropylene glycol. Each of these glycols may be used in combination.

Examples of the polybasic acid include, but not limited to, aliphatic unsaturated polybasic acids (egg., aliphatic unsaturated dibasic acids such as maleic anhydrides maleic acid and fumaric acid). Each of the unsaturated polybasic acids may be used in combination with a saturated polybasic acid such as phthalic anhydride or the like.

Examples of the crosslinking agent in the above-mentioned "crosslinking moiety" include, but not limited to, polymerizable vinyl monomers such as styrene and methyl methacrylate.

The thermosetting resin comprising a polyester and its crosslinking moiety which is a raw material for the styrene-maleic acid copolymer in the present invention is not particularly limited, as long as the styrene-maleic acid copolymer can be caused by the decomposition of the resin. Examples thereof include a thermosetting resin comprising a polyester containing a maleic acid residue (including fumaric acid residue) and its crosslinking moiety which is based on styrene and is bound to the maleic acid residue, which is obtained by using an acid for forming the maleic acid residue (e.g. maleic anhydride, maleic acid, and fumaric acid) as a polybasic acid for forming a polyester, and styrene as a crosslinking agent for forming a crosslinking moiety. The thermosetting resin may be of any type, in so far as the above-mentioned styrene-maleic acid copolymer can he obtained from the resin in other words there is no limit in selection of the type, structure and components of the resin, the type, amount and crosslinking degree of the crosslinking moiety (or a crosslinking agent), and the types and amounts of additives. For example, wastes from bathroom components, such as fiber-reinforced plastics (FRP) and the like, are also used as a raw material.

The above-mentioned hydrolysis reaction of the thermosetting resin with subcritical water is carried out by adding water to the thermosetting resin, and then increasing the temperature and pressure of water to thereby put the water in a subcritical state. The ratio of the thermosetting resin to water is not particularly limited. Preferably, 100 to 500 parts by weight of water is added to 100 parts by weight of the thermosetting resin.

The "subcritical water" referred to in the present invention means water in such a state that the temperature and pressure of the water are within the following ranges, respectively: the temperature and the pressure of water are not higher than the critical points of water (critical temperature: 374.4° C., and critical pressure: 22.1 MPa), provided that the temperature of the water is concurrently not lower than 140° C., and provided that the pressure of the water is concurrently not lower than 0.36 MPa (i.e., a saturated vapor pressure at 140° C.).

The temperature of the subcritical water in the reaction is lower than the thermal decomposition temperature of the thermosetting resin. The lower limit of the temperature of the subcritical water is preferably 180° C., and more preferably 200° C., and the upper limit thereof is preferably 280° C., and more preferably 270° C. When the temperature of the subcritical water is lower than the above lower limit during the decomposition reaction, a very long time is required to decompose the thermosetting resin, which may lead to a higher cost. On the other hand, when the temperature of the subcritical water is higher than the above upper limit during the decomposition reaction, the styrene-maleic acid copolymer is also decomposed, which makes it hard to recover the copolymer.

The thermal decomposition temperature of the thermosetting resin means a temperature which corresponds to the intersection point of a tangent drawn at a bending point of the decomposition steps of a resin component on a chart obtained by the thermogravimetric analysis (or TG analysis) of a resin sample, with a zero horizontal line of the TG curve.

The time for the treatment with the subcritical water changes depending on the conditions such as the reaction temperature, etc. For example, the time is from about 1 to about 12 hours, and preferably from about 1 to about 4 hours. The better, the shorter the time is, since the cost for the treatment is reduced. The pressure during the decomposition reaction (the treatment with subcritical water) changes depending on the conditions such as the reaction temperature, etc. The lower limit thereof is preferably 1 MPa, and more preferably 2 MPa, and the upper limit thereof is preferably 15 MPa, and more preferably MPa.

It is preferable in the above-mentioned reaction that subcritical water contains an alkaline salt. The alkaline salt in subcritical water accelerates the hydrolysis reaction of the thermosetting resin, so that the treating time and cost car be saved. When the thermosetting resin is treated with subcritical water within a high temperature range close to a supercritical state, a polyhydric alcohol as one of the decomposition products may be subjected to a secondary decomposition due to the acid catalytic effect of an organic acid which is concurrently produced. When an alkaline salt is contained in subcritical water, the base of the alkaline salt can neutralize the organic acid to thereby inhibit the above secondary decomposition of the polyhydric alcohol.

The term "alkaline salt" means a salt of an alkaline metal or a salt of an alkaline earth metal, which reacts with an acid to show basic properties. Examples of the alkaline salt include, but not limited to, the hydroxides of alkaline metals such as potassium hydroxide (KOH), sodium hydroxide (NaOH), etc., calcium carbonate, barium carbonate, calcium hydroxide, magnesium carbonate, etc., among which the hydroxides of the alkaline metals are particularly preferable.

Although not particularly limited, the content of the alkaline salt in subcritical water is preferably not less than 2 molar equivalents relative to the theoretical number of moles of an acid residue (or a maleic acid residue) contained in the above-mentioned styrene-maleic acid copolymer, which is obtained by decomposing the thermosetting resin. When the content of the alkaline salt is less than 2 molar equivalents, it may become hard to recover the above resin. While not limited to, the upper limit of the content of the alkaline salt in subcritical water is preferably not more than 10 molar equivalents in view of cost.

The "theoretical number of moles of an acid residue contained in a styrene-maleic acid copolymer" means an estimated number of moles of the acid residue (or the maleic acid residue) in the compound obtained through the decomposition calculated from a ratio of the number of the molecules of the acid residue and the number of the molecules of the residue derived from the crosslinking moiety, obtained by the NMR analysis of the compound, and from the amount of the crosslinking moiety-forming material used.

The concentration of the alkaline salt in the subcritical water is generally not less than 0.2 mol/L.

When the above-mentioned thermosetting resin is thus subjected to the hydrolysis with the subcritical water as a reaction solvent, preferably in the presence of the alkaline salt, the ester bonds of the polyester are hydrolyzed, whereas the binding sites between a maleic acid residue and a crosslinking moiety based on styrene are not hydrolyzed. As a result, the styrene-maleic acid copolymer can be obtained as a decomposition product.

The modified styrene-maleic acid copolymer according to the -resent invention can be obtained by reacting at least a part of the carboxylic acid groups in the above-mentioned styrene-maleic acid copolymer with a halogen and/or epoxy compound containing a halogen and/or epoxy group as a modifying agent (see the following formulas (2) and (3)).

The "carboxylic acid group" means a carboxy group or a salt thereof in a maleic acid structure moiety (maleic acid unit) in the above-mentioned styrene-maleic acid copolymer, which corresponds to the —COOA moiety in the above-mentioned formula (1).

The "part" means that all of the carboxylic acid groups in the above-mentioned styrene-maleic acid copolymer do not necessarily have to be modified, and a part of carboxylic acid groups may be modified The following formula (2) shows a reaction of the above-mentioned styrene-maleic acid copolymer with a halogen compound (corresponding to the R—X in the formula (2), wherein X is a halogen, and R is a group other than a halogen). The modified styrene-maleic acid copolymer can be obtained by the substitution reaction of the carboxylic acid group moiety in the maleic acid structure moiety with the halogen compound. The formula (2) shows a reaction scheme wherein the halogen compound is used in 0.5 equivalent relative to the carbonate in the maleic acid structure moiety.

[Formula 2]

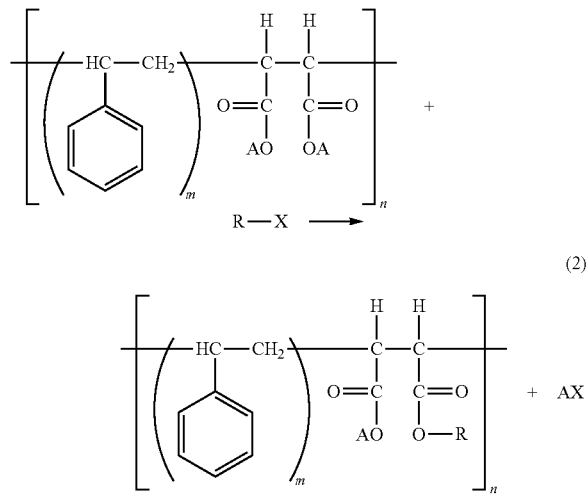

(2)

The following formula (3) shows a reaction of the carboxylic acid group in the styrene-maleic acid copolymer (when A is a hydrogen atom in the formula (i)) with a compound containing an epoxy group (corresponding to R—CH$_2$—(—O—)—CH$_2$ in the formula (3), wherein R is a group other than an epoxy group). In this case, a hydrophilic group (hydroxy group) is also contained in a connection part, which is a part derived from an epoxy group, between the group R and the resin, so that a modified styrene-maleic acid copolymer having superior water-absorbing property can be obtained.

[Formula 3]

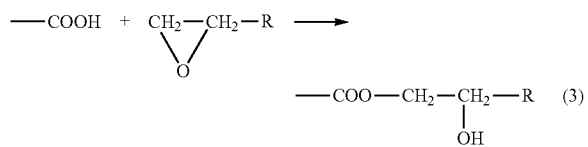

The above-mentioned halogen and/or epoxy compound used as a modifying agent for the styrene-maleic acid copolymer in the present invention is a compound containing at least one halogen and/or epoxy group. Examples thereof include a compound (halogen compound) containing at least one halogen, a compound (epoxy compound) containing at least one epoxy group, and a compound containing at least one halogen and at least one epoxy group, which is belong to both of the halogen compound and the epoxy compound. In the present invention, two or more of these compounds may be used in combination.

The "halogen" in the above-mentioned compound includes a fluorine atom, a chlorine atom, a bromine atom, an iodine atom and the like. At is preferable to use a chlorine atom, a bromine atom, or an iodine atom, since these atoms show a superior effect as a leaving group.

The above-mentioned halogen compound includes not only a compound containing at least one halogen, but also a compound containing two or more halogens. Examples of the compound include 1,3-dichloro-2-propanol, chlorobenzene, benzyl chloride, a benzyl chloride compound having a substituent bound to the benzene ring, a halogenated alkyl and the like.

The benzyl chloride compound having a substituent bound to the benzene ring includes methylbenzyl chloride, nitrobenzyl chloride and the like.

The halogenated alkyl is represented by the general formula: $C_nH_{2n+1}X$, wherein X is a fluorine atom, a chlorine atom, a bromine atom, or an iodine atom. Examples thereof include methyl iodide, propyl bromide, isopropyl bromide and the like.

The above-mentioned epoxy compound includes not only a compound containing at least one epoxy group, but also a compound containing two or more epoxy groups. Examples of the compound include a compound containing a glycidyl group, a compound containing a glycidyl ether group and the like. Specific examples thereof include 1,4-butanediol diglycidyl ether, styrene oxide (1,2-epoxybenzene), phenyl glycidyl ether, glycidol(2,3-epoxy-1-propanol) and the like.

The above-mentioned compound containing at least one halogen and at least one epoxy group also includes a compound containing two or more halogens and two or more epoxy groups (e.g., a glycidyl group or a glycidyl ether group). Examples of the compound include epichlorohydrin and the like.

In particular, when the modified styrene-maleic acid copolymer according to the present invention is used as a low profile additive for a thermosetting resin as described below, it is preferable to use a halogen compound containing no unsaturated groups as a halogen and/or epoxy compound. This is based on the following speculations when a compound having an unsaturated group is used as a modifying agent, the polymerization reaction of compounds having an unsaturated group may proceed more rapidly than the modification reaction of the styrene-maleic acid copolymer, so that the modification of the resultant modified copolymer may be insufficient and the low profile ability of the resultant modified copolymer may be reduced. In addition, the polymer of compounds having an unsaturated group may be reacted with the styrene-maleic acid copolymer, so that the reaction solution may be clouded due to the formation of the high-molecular-weight product and the low profile ability of the resultant modified copolymer may he reduced.

Examples of the halogen compound containing no unsaturated groups include epichlorohydrin, 1,3-dichloro-2-propanol, chlorobenzene, benzyl chloride, a benzyl chloride compound having a substituent bound to the benzene ring, a halogenated alkyl and the like.

In particular, when the modified styrene-maleic acid copolymer according to the present invention is used as a water-absorbing resin as described below, it is preferable to use a compound containing at least two halogens and/or epoxy groups, i.e., a compound containing at least two halogens, a compound containing at least one halogen and at least one epoxy group, and a compound containing at least two epoxy groups, as a halogen and/or epoxy compound. In this case, a crosslinking structure via a residue of the compound may be formed intermolecular or between the different molecules of the styrene-fumarate molecule forming the styrene-maleic acid copolymer.

Preferred examples of the compound containing at least two halogens include 1,3-dichloro-2-propanol. This propanol is water-soluble, and can be easily reacted with the styrene-maleic acid copolymer. In other words, the styrene-maleic acid copolymer can be modified into a resin showing a superior water-absorbing property by using the compound in relatively mild conditions.

Preferred examples of the compound containing at least one halogen and at least one epoxy group include epichlorohydrin and the like. In the case of using epichlorohydrin, the resultant modified styrene-maleic acid copolymer may have a crosslinking structure containing a hydrophilic group, so that the modified copolymer may become a resin showing a superior water-absorbing property.

Preferred examples of the compound containing at least two epoxy groups include 1,4-butanediol diglycidyl ether and the like. Although this ether is hardly soluble in water and has a poor reactivity to the styrene-maleic acid copolymer, the resultant modified styrene-maleic acid copolymer may have a crosslinking structure containing a lot of hydrophilic groups, so that the modified copolymer can be utilized as a polymer having a relatively high molecular weight, and showing a high water-absorbing property and a heat resistance.

The amount of the halogen and/or epoxy compound to be reacted with the styrene-maleic acid copolymer is not particularly limited. Also, the reaction temperature, the reaction time and the like are not particularly limited. Accordingly, these can be changed in accordance with the desired properties of the resultant modified styrene-maleic acid copolymer.

For example, when a modified styrene-maleic acid copolymer, which is suitable as a low profile additive for reducing a curing shrinkage of a thermosetting resin, is produced by using a halogen compound containing no unsaturated groups, it is preferable to adjust the amount of the halogen in the halogen compound to be $4/5$ or more equivalent relative to 1 equivalent of the carboxylic acid group in the styrene-maleic acid copolymer. When the amount of the halogen in the compound is less than $4/5$ equivalent relative to the amount of the carboxylic acid group in the styrene-maleic acid copolymer, the amount of the group having no unsaturated groups to be incorporated into the styrene-maleic acid copolymer may be insufficient, so that when the resultant copolymer is used as a low profile additives the low profile effect cannot be sufficiently obtained. The upper limit of the amount of the compound to be reacted is not particularly limited. Further reaction does not occur even if the compound is used such that the amount of the halogen and/or epoxy group in the compound is more than 1 equivalent relative to 1 equivalent of the carboxylic acid group in the styrene-maleic acid copolymer. In this regard, it may he possible that the compound is added such that the amount is about 3 times equivalents, and then, the excessive amounts of the compound is recovered after the reaction, in order to accelerate the reaction rate.

In this case, the reaction of the carboxylic acid group in the styrene-maleic acid copolymer with the halogen compound containing no unsaturated groups is carried out at a temperature of preferably 100° C. or less, and more preferably 80° C. or less. When the reaction temperature exceeds 100° C., side reactions may be caused. The lower limit of the reaction temperature is not particularly limited, but is preferably 40° C. or more in order to ensure the reaction rate. The reaction time is not particularly limited, but is preferably within a range of 2 to 10 hours.

In this case, it is preferable to react the carboxylic acid group in the styrene-maleic acid copolymer with the halogen compound containing no unsaturated groups in the presence of a phase-transfer catalyst. Examples of the phase-transfer catalyst include a quaternary ammonium salt such as tetra-n-butylammonium bromide ($[CH_3(CH_2)_3]_4N.Br$). For examples the reaction of the carboxylic acid group with the halogen compound containing no unsaturated groups may be effectively progressed by using tetra-n-butylammonium bromide ($[CH_3(CH_2)_3]_4N.Br$) as a phase-transfer catalyst in a water-toluene phase.

In addition, for example, when a modified styrene-maleic acid copolymer having a high water-absorbing property is produced by using a compound containing at least two halogens and/or epoxy groups, it is preferable to mix and react the compound containing at least two halogens and/or epoxy groups with the styrene-maleic acid copolymer such that the amount of the halogen and/or epoxy group in the compound is $4/5$ or less equivalent relative to the amount of the carboxylic acid group in the copolymer. In this case, a modified resin containing a crosslinking structure containing a hydrophilic group can be reproducibly obtained. When the amount of the halogen and/or epoxy group is more than $4/5$ equivalent relative to the carboxylic acid group in the styrene-maleic acid copolymer, a modified styrene-maleic acid copolymer having a high water-absorbing property may not be obtained. The lower limit of the equivalent of the halogen and/or epoxy group relative to the carboxylic acid group in the styrene-maleic acid copolymer is not particularly limited. It is preferable to mix the compound containing at least two halogens and/or epoxy groups with the styrene-maleic acid copolymer such that the halogen and/or epoxy group in the compound is $1/5$ or more equivalent relative to the carboxylic acid group in the copolymer in order obtain a modified styrene-maleic acid copolymer having a high water-absorbing property.

In this case, the reaction temperature and the reaction time can be appropriately adjusted depending on the kind of the styrene-maleic acid copolymer or the compound containing at least two halogens and/or epoxy groups to be used, and the like. For example, the temperature can be set within a range of 30 to 121° C., and the reaction time can be set within a range of 1 to 10 hours.

The modification rate of the carboxylic acid group in the modified styrene-maleic acid copolymer obtained as described above can be varied depending on the kind and the amount of the halogen and/or epoxy compound to be used, reaction conditions, and the like.

When the modified styrene-maleic acid copolymer is used as a low profile additive for a thermosetting resin, the higher the modification rate is, the more preferable it is. It is preferably 70 to 100 mol %, and more preferably 80 to 100 mol %. When the modification rate is too low, the reducing effect on the curing shrinkage may be insufficient.

In addition, when the modified styrene-maleic acid copolymer is used as a water-absorbing material, the modification rate is preferably 2 to 70 mol %, and more preferably 5 to 50 mole. When it violates either the lower limit or the upper limit, the water-absorbing property may be insufficient.

The modified styrene-maleic acid copolymer according to the present invention can reduce a curing shrinkage of a thermosetting resin, so that it can be effectively used as a low profile additive for a thermosetting resin. The modified resin has a water-absorbing property, so that it can be effectively used as a water-absorbing material.

The modified styrene-maleic acid copolymer according to the present invention, in particular, the resin modified with the halogen compound containing no unsaturated groups, has a superior reducing effect on a curing shrinkage of a thermosetting resin, so that it is useful as a low profile additive for a thermosetting resin (in particular, an unsaturated polyester resin) Accordingly, a low profile unsaturated polyester resin composition can be prepared by mixing the modified styrene-maleic acid copolymer according to the present invention, styrene, an unsaturated polyester resin, and a radical initiator, and optionally an inorganic filler such as calcium carbonate and other components.

Examples of the unsaturated polyester resin used in the above-mentioned resin composition include known unsaturated polyester resins such as those obtained by binding a polyhydric alcohol such as glycols (e.g., ethylene glycol, propylene glycol, diethylene glycol, and dipropylene glycol) to an unsaturated polybasic acid such as an aliphatic unsaturated dibasic acid (e.g., maleic anhydride, maleic acid, and fumaric acid) via an ester bond. The unsaturated polyester resin may also be a virgin thermosetting resin, or a resin prepared from monomers (i.e. a polyhydric alcohol and an unsaturated polybasic acid) obtained by hydrolyzing a thermosetting resin comprising an unsaturated polyester resin.

As a radical initiator used in the above-mentioned resin composition, those which is generally used for a unsaturated polyester resin can be used. Examples thereof include, but not limited to, methyl ethyl ketone peroxide, benzoyl peroxide, 1,1-di(t-butylperoxy)butane, di(4-t-butylcyclohexyl)peroxy dicarbonate and the like.

The amount of the modified styrene-maleic acid copolymer to be added into the above-mentioned resin composition is preferably within a range of 0.1 to 10% by weight, more preferably 1 to 10% by weight, relative to the total amount of the resin composition. When the amount of the modified styrene-maleic acid copolymer to be added is less than 0.1% by weight, the reducing effect on the curing shrinkage may not be sufficiently obtained, whereas when the amount of the modified styrene-maleic acid copolymer to be added is more than 10% by weight, a problem such as a deterioration of solvent resistance may be caused.

The amount of the unsaturated polyester to be added into the above-mentioned resin composition is preferably within a range of 10 to 50% by weight, more preferably 35 to 50% by weight, relative to the total amount of the unsaturated polyester resin composition.

The amount of styrene to be added is preferably within a range of 7 to 50% by weight, and more preferably 35 to 50% by weight, relative to the total amount of the unsaturated polyester resin composition.

The amount of the radical initiator to be added is preferably within a range of 0.5 to 2% by weight relative to the total amount of the unsaturated polyester resin composition. When the amount of the radical initiator to be added is less than 0.5% by weight, the reaction rate is slowed down, whereas when the amount exceeds 2% by weight, the reaction rate is too fast to control.

In addition, the amount of other components (e.g., an inorganic filler) to be optionally added into the above-mentioned unsaturated polyester resin composition is, for example, within a range of 0 to 70% by weight relative to the total amount of the resin composition, although not particularly limited thereto.

A molded article can be produced by molding the thus prepared unsaturated polyester resin composition according to any of methods such as injection-molding, transfer molding, compression molding and the like.

A sheet molding compound can be produced by impregnating a fiber mat with the unsaturated polyester resin composition prepared as described above. Any type of fiber mats such as glass fiber mat can be used as a fiber mat. The sheet molding compound can be produced, for example, by providing the unsaturated polyester resin onto a fiber mat, which is obtained by accumulating a chopped strand of glass fiber roving, in uniform thickness, and then, inserting the resultant mat between two support films to thereby form a sheet. This sheet molding compound can be set into a mold and subjected to heat/pressure molding to thereby produce a fiber-reinforced plastic (FRP) used as a bathroom component product such as a bathtub and a waterproof pan for bathroom.

The present invention also provides a process for recycling a thermosetting resin, which comprises (1) decomposing a thermosetting resin comprising a polyester and its crosslinking moiety with subcritical water to thereby obtain a styrene-maleic acid copolymer, and (2) reacting the carboxylic acid group in the styrene-maleic acid copolymer with a halogen and/or epoxy compound to thereby obtain a modified styrene-maleic acid copolymer.

In other words, the process provides a way for recycling a decomposition product (a styrene-maleic acid copolymer) obtained by decomposing a thermosetting resin with subcritical water and recovering the decomposition product.

Preferably, the process further comprises (3) providing an unsaturated polyester resin composition comprising the modified styrene-maleic acid copolymer, styrenes an unsaturated polyester resin, and a radical initiator, and (4) molding the unsaturated polyester resin composition.

The above-mentioned step (2) preferably comprises reacting the carboxylic acid group in the styrene-maleic acid copolymer with a halogen and/or epoxy compound such that the amount of the halogen and/or epoxy group in the compound is ⅘ or more equivalent relative to the amount of the carboxylic acid group in the copolymer, preferably at a temperature of 80° C. or less, to thereby obtain a modified styrene-maleic acid copolymer.

EXAMPLES

The present invention will be described in more detail below by way of Examples thereof. The evaluation methods for the properties of the resins used in Examples will be described below.

<Evaluation of Properties>

(Modification Rate)

The modification rate of the carboxylic acid group was calculated from the peak (1610 to 1550 cm$^{-1}$) strength of carboxylate and the peak (1770 to 1720 cm$^{-1}$) strength of ester generated after the reaction, which were measured by an infrared spectroscopic analysis (Shrinkage Rate)

The shrinkage rate was determined by measuring a dimensional change after the unsaturated polyester resin composition was poured into a mold (100 mm×100 mm) and cured.

(Reaction Rate)

The cured molded article was immersed in a hot water at 100° C. for 5 hours (hot water reflux extraction). The reaction rate was calculated from the amount of an unreacted material extracted with a hot water, which was represented as "hot water extraction".

(Flexural Modulus and Flexural Strength)

The flexural modulus and the flexural strength were determined according to JIS-K7017 under the following conditions: test piece dimensions: 2 mm thickness×12 mm width× 80 mm length; distance between points of support: 50 mm; the test speed: 2 mm/min. The strengths with the displacements of an indenter at the center of the test piece were measured. The flexural modulus was determined based on the linear relationship between the displacement and the strength, and the flexural strength was determined from the strength at the yield point.

(Izod Impact Strength)

The izod impact strength test was performed by using a test piece (dimensions: 2 mm thickness×12 mm width×80 mm length), according to JIS-K7062 The izod impact strength was determined by fixing one side of the test piece, hitting the test piece with a hammer and measuring the energy needed to fracture the test piece.

(Amount of Water Absorption)

The evaluation method for the amount of water absorption was performed according to "Testing method or water absorption capacity of super absorbent polymers" described in JIS-K7223. The procedure of the method is outlined below.

This test was performed by using deionized water. Each sample (about 0.20 g) is taken and weighed (a (g) The weighed sample is charged into the bottom of a tea bag, and the tea bag is immersed in deionized water contained in a 1 L beaker. The immersion time was set to 3 hours. After 3 hours, the tea bag is taken up from the water and sufficiently drained, and the weight (b (g)) of the tea bag is measured. In the other hand, a tea bag containing no sample is immersed for the same immersion time and drained, and the weight (c (g)) of the tea bag is measured.

The same procedure was repeated three times, and the average value was calculated. The amount of water absorption W (g/g) was calculated according to the following equation (1):

$$W(g/g)=(b-c-a)/a \quad (1)$$

Example A

Example A1

An unsaturated polyester varnish (solvent free) having a weight-average molecular weight of 4000 to 5000 was synthesized by the condensation polymerization of propylene glycol as a glycol with maleic anhydride as an unsaturated dibasic acid in equimolar amounts. Then, the resultant unsaturated polyester, styrene, methyl ethyl ketone peroxide as a radical initiator, and calcium carbonate as an inorganic filler were mixed in a weight ratio of the unsaturated polyester:styrene:methyl ethyl ketone peroxide:calcium carbonate=1:1:0.02:2, and the mixture was cured. The cured product was used as an unsaturated polyester resin to be decomposed and recovered.

Next, the cured product (3 g) of the unsaturated polyester resin, purified water (15 g), and KOH (0.84 g) were charged into a reaction tube, and the internal atmosphere of the reaction tube was replaced with an argon gas. Then, this reaction tube was tightly-sealed and immersed in a constant temperature bath at a temperature of 230° C., to thereby put the water in the reaction tube into a subcritical state and decompose the cured product for 4 hours. After that, the contents in the reaction tube were separated by filtration into an inorganic material and an aqueous solution. Next, the aqueous solution was adjusted with hydrochloric acid to an acidic region of pH 4 or less, to thereby form a precipitate of a water-soluble component contained in the aqueous solution. Then, the precipitate was recovered by filtration to obtain a styrene-maleic acid copolymer.

Next, the styrene-maleic acid copolymer (15 g) obtained from the above-mentioned method was dissolved into an alkaline water obtained by dissolving potassium hydroxide (5.2 g) in water (79.8 g). Then, to this aqueous solution (100 g) of the potassium salt of the styrene-maleic acid copolymer were added toluene (100 g) and tetra-n-butylammonium bromide (1 g) as a phase-transfer catalyst, and the mixture was stirred for 5 minutes. To this was further added epichlorohydrin (7 g) as a halogen and/or epoxy compound, and the mixture was reacted at 50° C. for 5 hours. After that, the reaction product was separated into a water phase and an organic phase by using a separation funnel. By removing toluene from the organic phase, a modified styrene-maleic acid copolymer containing maleic acid structure moieties into which groups having no unsaturated groups were incorporated was obtained as a white powder (16 g; modification rate 80 mol %).

Next, the above-mentioned unsaturated polyester resin varnish (solvent free) having a weight-average molecular weight of 4000 to 5030, styrenes methyl ethyl ketone peroxide as a radical initiator, and calcium carbonate as an inorganic filler were mixed in a weight ratio of the unsaturated polyester:styrene:methyl ethyl ketone peroxide:calcium carbonate=1:1:0.02:2. Then, the above-mentioned modified styrene-maleic acid copolymer was further mixed to the mixture, such that the amount of the modified copolymer was 10% by weight based on the total amount of the composition, to thereby prepare an unsaturated polyester resin composition.

Example A2

A modified styrene-maleic acid copolymer containing maleic acid structure moieties into which groups having no unsaturated groups were incorporated was obtained as a white powder (19 g; modification rate 83 mol %) in the same manner as in Example A1, except that 1,3-dichloro-2-propanol (10 g) was mixed as a halogen and/or epoxy compound instead of epichlorohydrin (7 g), and the reaction was carried out at 80° C. for 5 hours. After that, an unsaturated polyester resin composition was prepared by using this modified styrene-maleic acid copolymer in the same manner as in Example A1.

Example A3

A modified styrene-maleic acid copolymer containing maleic acid structure moieties into which groups having no unsaturated groups were incorporated was obtained as a white powder (17.5 g; modification rate 85 mol %) in the same manner as in Example A1, except that chlorobenzene (9 g) was mixed as a halogen and/or epoxy compound instead of epichlorohydrin (7 g), and the react-on was carried out at 60° C. for 5 hours. After that, an unsaturated polyester resin composition was prepared by using this modified styrene-maleic acid copolymer in the same manner as in Example A1.

Example A4

A modified styrene-maleic acid copolymer containing maleic acid structure moieties into which groups having no unsaturated groups were incorporated was obtained as a white powder (18.5 g; modification rate 93 mol %) in the same manner as in Example A1, except that tetra-n-butylammonium bromide (7 g) was mixed as a phase-transfer catalyst, and benzyl chloride (28 g) was mixed as a halogen and/or epoxy compound instead of epichlorohydrin (7 g), and the reaction was carried out at 80° C. for 10 hours. After that, an unsaturated polyester resin composition was prepared by using this modified styrene-maleic acid copolymer in the same manner as in Example A1.

Example A5

A modified styrene-maleic acid copolymer containing maleic acid structure moieties into which groups having no unsaturated groups were incorporated was obtained as a white powder (19.5 g; modification rate 95 mol %) in the same manner as in Example A1, except that tetra-n-butylammonium bromide (7 g) was mixed as a phase-transfer catalyst, and methylbenzyl chloride (32 g) was mixed as a halogen and/or epoxy compound instead of epichlorohydrin (7 g), and the reaction was carried out at 70° C. for 10 hours. After that, an unsaturated polyester resin composition was prepared by using this modified styrene-maleic acid copolymer in the same manner as in Example A1.

Example A6

A modified styrene-maleic acid copolymer containing maleic acid structure moieties into which groups having no unsaturated groups were incorporated was obtained as a white powder (22 g; modification rate 100 mol %) in the same manner as in Example A1, except that tetra-n-butylammonium bromide (7 g) was mixed as a phase-transfer catalyst, and nitrobenzyl chloride (39 g) was mixed as a halogen and/or epoxy compound instead of epichlorohydrin (7 g), and the reaction was carried out at 80° C. for 10 hours. After that, an unsaturated polyester resin composition was prepared by using this modified styrene-maleic acid copolymer in the same manner as in Example A1.

Example A7

A modified styrene-maleic acid copolymer containing maleic acid structure moieties into which groups having no unsaturated groups were incorporated was obtained as a white powder (15 g; modification rate 70 mol %) in the same manner as in Example A1, except that tetra-n-butylammonium bromide (2.5 g) was mixed as a phase-transfer catalyst, and propyl bromide (9.2 g) was mixed as a halogen and/or epoxy compound instead of epichlorohydrin (7 g), and the reaction was carried out at 70° C. for 22 hours. After that, an unsaturated polyester resin composition was prepared by using this modified styrene-maleic acid copolymer in the same manner as in Example A1.

Example A8

A modified styrene-maleic acid copolymer containing maleic acid structure moieties into which groups having no unsaturated groups were Incorporated was obtained as a white powder (18.7 g; modification rate 100 mol %) in the same manner as in Example A1, except that tetra-n-butylammonium bromide (7 g) was mixed as a phase-transfer catalyst and benzyl chloride (28 g) was mixed as a halogen and/or epoxy compound instead of epichlorohydrin (7 g), and the reaction was carried out at 100° C. for 6 hours. After that, an unsaturated polyester resin composition was prepared by using this modified styrene-maleic acid copolymer in the same manner as in Example A1.

Comparative Example A1 the same manner as in Example A1, the cured product of the unsaturated polyester resin was decomposed with subcritical water in the presence of KOH to thereby recover a styrene-maleic acid copolymer. After that, an unsaturated polyester resin composition was prepared by using this styrene-maleic acid copolymer without the modification in the same manner as in Example A1.

The unsaturated polyester resin compositions obtained in Examples A1 to A8 and Comparative Example A1 were cured at room temperature for 1 hour, followed by at 100° C. for 2 hours with heating, to thereby obtain the molded articles of Example A1 to A8 and Comparative Example A1.

For the purpose of comparison, the above-mentioned unsaturated polyester resin varnish having a weight-average molecular weight of 4000 to 5000, styrene, methyl ethyl ketone peroxide as a radical initiator, and calcium carbonate as an inorganic filler were mixed in a weight ratio of the unsaturated polyester resin:styrene:methyl ethyl ketone peroxide:calcium carbonate=1:1.0.02:2 to thereby obtain a virgin unsaturated polyester resin composition, and the composition was molded in the same manner as described above to thereby obtain a control molded article.

For each of the cured molded articles of the control, Example A1 to A8 and Comparative Example A1, the appearance was observed, and the shrinkage rate, the flexural modulus, the flexural strength and the Izod impact were determined. In addition, the reaction rate was determined for each of the articles of Example A4 to A8, control and Comparative Example A1. The results are shown in Table 1.

[Table 1]

|  | Cont. | Ex. A1 | Ex. A2 | Ex. A3 | Ex. A4 | Ex. A5 | Ex. A6 | Ex. A7 | Ex. A8 | Com. Ex. A1 |
|---|---|---|---|---|---|---|---|---|---|---|
| Appearance evaluation | | | | No problems | | | | | | Many bumps |
| Reaction rate (%) Hot water extraction | 99.3 | — | — | — | 99.8 | 99.6 | 99.7 | 99.7 | 99.8 | 90 |
| Shrinkage rate (%) | 4 | 0 | 0 | 0 | 0 | 0 | 0 | 0 | 0 | 4 |
| Flexural modulus (MPa) | 6700 | 6800 | 6900 | 6700 | 7000 | 6800 | 6900 | 6800 | 7000 | — |
| Flexural strength (MPa) | 47 | 48 | 49 | 47 | 49 | 48 | 49 | 48 | 49 | — |
| Izod impact (kJ/m$^2$) | 2.0 | 2.1 | 2.0 | 1.9 | 2.2 | 2.1 | 2.2 | 2.0 | 2.2 | — |

The molded article of Comparative Example A1, which was obtained by using the recovered styrene-maleic acid copolymer without the modification, had many bumps and showed a large curing shrinkage. Therefore, the recovered styrene-maleic acid copolymer as is was not reusable. On the other hand, the molded articles of Example A1 to 8, which were obtained by using the modified styrene-maleic acid copolymers modified with a halogen and/or epoxy compound, showed no curing shrinkage, and had appearances and properties comparable to those of the control molded article of the virgin unsaturated polyester resin that was not a recovered product. Consequently, it was confirmed that the modified styrene-maleic acid copolymers were effectively reusable.

Example B

[Process for Decomposing Unsaturated Polyester Resin with Subcritical Water and Process for Separating and Recovering Styrene-maleic Acid Copolymer]

An unsaturated polyester resin having a weight-average molecular weight of 4000 to 5000 was produced by using propylene glycol as a glycol and maleic anhydride as an organic acid. To a varnish containing this unsaturated polyester resin was added styrene in almost equivalent, calcium carbonate as an inorganic filler was added thereto, and the mixture was cured.

Next, this cured product (3 g) and an aqueous KON solution (15 g) at a concentration of 1.0 mol/l were charged into a reaction tube, and the internal atmosphere of the reaction tube was replaced with an argon gas. Then, this reaction tube was tightly-sealed and immersed in a constant temperature bath at a temperature of 230° C., to thereby decompose the cured product of the unsaturated polyester resin containing calcium carbonate with subcritical water for 4 hours. After that, the reaction tube was cooled, and the contents in the reaction tube were separated by filtration into an inorganic material and an aqueous solution. Next, the aqueous solution was adjusted with hydrochloric acid to an acidic region of pH 4 or less, to thereby form a precipitate of a water-soluble component, i.e. a styrene-maleic acid copolymer, contained in the aqueous solution. Then, the styrene-maleic acid copolymer was separated by filtration and recovered.

Example B1

The styrene-maleic acid copolymer (5 g) recovered by the above-mentioned method was dissolved in an alkaline water (95 g) adjusted to pH 12 with potassium hydroxide. After that, 1,3-dichloro-2-propanol (0.5 g; about 0.40 equivalent relative to the amount of the carboxylic acid group in the styrene-maleic acid copolymer) was added thereto, and the mixture was heated with stirring at 80° C. for 2 hours. Then, the liquid heated with stirring was uniformly spread into an aluminum vat lined with a Teflon® sheet, and allowed to stand for about 30 minutes. Next, the aluminum vat was heated with a drier at 80° C. for 1 hour, followed by at 100° C. for 2 hours, to thereby obtain a white film. Then, this film was pulverized to obtain a modified styrene-maleic acid copolymer as a white powder (modification rate: 10 mol %).

Example B2

A modified styrene-maleic acid copolymer was obtained as a white powder (modification rate: 15 mol %) in the same manner as in Example B1, except that epichlorohydrn (0.5 g; about 0.45 equivalent relative to the amount of the carboxylic acid group in the styrene-maleic acid copolymer) was added instead of 1,3dichloro-2-propanol.

Example B3

A modified styrene-maleic acid copolymer was obtained as a white powder (modification rate: 17 mol %) in the same manner as in Example B1, except that 1,4-butanediol diglycidyl ether (0.5 g; about 0.48 equivalent relative to the amount of the carboxylic acid group in the styrene-maleic acid copolymer) was added instead of 1,3-dichloro-2-propanol.

Example B4

A modified styrene-maleic acid copolymer was obtained as a white powder (modification rate: 35 mol %) in the same manner as in Example B1, except that 1,3-dichloro-2-propanol (1.5 g; about 1.2 equivalents relative to the carboxylic acid group in the styrene-maleic acid copolymer) was added.

Comparative Example B1

A white powder was obtained in the same manner as in Example B1, except that 1,3-dichloro-2-propanol was not used.

(Evaluation of Properties)

The evaluation of the amount of water absorption was carried out for each of white powders obtained in Examples B1 to B4 and Comparative Example. The results are shown in Table 2.

TABLE 2

|  | Ex. B1 | Ex. B2 | Ex. B3 | Ex. B4 | Com. Ex. B1 |
|---|---|---|---|---|---|
| Amount of absorption W (g/g) | 55.2 | 48.9 | 45.3 | 1.2 | ≈0 |

Each of the powders of Examples B1 to B3 almost similarly showed a high water-absorbing property, as represented by an amount of water absorption of around 50. In contrast, the powder of Comparative Example was partially dissolved in water, and the insoluble residue thereof hardly showed a water-absorbing property. The powder of Example B4 was remained in the form of the white powder in water, but it showed better water-absorbing property than the powder of Comparative Example. This is attributed to the fact that at least 1 or more equivalents of 1,3-dichloro-2-propanol was used.

From the results of Examples B1 to B3, it is confirmed that a styrene-maleic acid copolymer can be modified by the above-mentioned method into the modified styrene-maleic acid copolymer according to the present invention, thereby being able to have a water-absorbing property. In addition, a copolymer (a styrene-maleic acid copolymer) of a crosslinking moiety and an organic acid, which is obtained by decomposing a thermosetting resin comprising a polyester and its crosslinking moiety with subcritical water at a temperature lower than the thermal decomposition temperature of the thermosetting resin and recovering the decomposition product, can be modified by the above-mentioned method into the modified styrene-maleic acid copolymer according to the present invention, thereby being reusable as a high water-absorbing resin. Accordingly, among the components derived from a thermosetting resin comprising a polyester and its crosslinking moiety by decomposing the thermosetting resin with subcritical water at a temperature lower than the thermal decomposition temperature of the thermosetting resin, glycol and organic acid monomers are reused as a material for the resin, and a styrene-maleic acid copolymer is modified and reused as a high water-absorbing resin. As a result, 80% or more of the components derived from the resin can be recycled.

The invention claimed is:

1. A modified styrene-maleic acid copolymer, which is produced by a process comprising reacting a carboxylic acid salt in a styrene-maleic acid copolymer with a halogen compound containing one halogen and no polymerizable unsaturated groups, the halogen compound being selected from the group consisting of benzyl chloride and a benzyl chloride compound having a substituent bound to the benzene ring, except for nitrobenzyl chloride, wherein the styrene-maleic acid copolymer to be modified is represented by a formula,

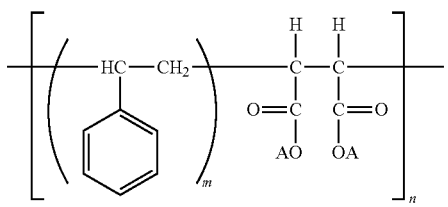

where A is a metal element, m is a number from 1 to 3, n is a number from 3 to 300, and both ends are hydrogen atoms, with the proviso that when A is a di- or more valent metal element, the metal element may form a salt with plural caboxy groups which are not limited to ones in a same molecule, and the modified styrene-maleic acid copolymer has at least one ester group formed by a reaction of at least one of carboxyl groups of the styrene-maleic acid copolymer and the group other than halogen of the halogen compound and wherein a modification rate of the carboxyl groups of the styrene-maleic acid copolymer is from 70% to 95%.

2. The modified styrene-maleic acid copolymer according to claim 1, which is produced by the process comprising reacting the carboxylic acid salt in the styrene-maleic acid copolymer with the halogen compound such that the amount of the halogen in the compound is ⅘ or more equivalent relative to the amount of the carboxylic acid salt in the copolymer.

3. The modified styrene-maleic acid copolymer according to claim 1, wherein the styrene-maleic acid copolymer to be modified is produced by a process comprising decomposing a thermosetting resin comprising a polyester and its crosslinking moiety with subcritical water.

4. The modified styrene-maleic acid copolymer according to claim 1, wherein the benzyl chloride compound is methylbenzyl chloride.

5. The modified styrene-maleic acid copolymer according to claim 1, wherein a modification rate of the carboxyl groups of the styrene-maleic acid copolymer is from 85% to 95%.

* * * * *